United States Patent
Moschini et al.

(10) Patent No.: US 6,782,872 B2
(45) Date of Patent: Aug. 31, 2004

(54) FLOW DIVIDER DEVICE FOR AIR MANIFOLDS ADAPTED TO GENERATE TURBULENT FLOWS IN COMBUSTION CHAMBERS

(75) Inventors: Renzo Moschini, Bologna (IT); Paolo Bortolotti, Sanford, NC (US); Maurizio Xella, Bologna (IT); Nazario Bellato, Bologna (IT); Gianluca Mattogno, Frascati (IT); Stefano Tartari, Casalecchio di Reno (IT); Bruno Monteverde, Bologna (IT)

(73) Assignee: Magneti Marelli Powertrain S.p.A., Viale Aldo Borletti (IT)

( * ) Notice: Subject to any disclaimer, the term of this patent is extended or adjusted under 35 U.S.C. 154(b) by 0 days.

(21) Appl. No.: 10/447,264

(22) Filed: May 29, 2003

(65) Prior Publication Data

US 2004/0053178 A1 Mar. 18, 2004

(30) Foreign Application Priority Data

May 31, 2002 (IT) .................................... BO2002A0339

(51) Int. Cl.$^7$ ................................................ F02D 9/08
(52) U.S. Cl. ........................ 123/470; 123/306; 123/337
(58) Field of Search .............................. 123/470, 472, 123/306, 195 A, 337, 184.38, 184.44, 184.45, 184.49, 184.52, 184.53, 184.55, 184.59

(56) References Cited

U.S. PATENT DOCUMENTS

| | | | | |
|---|---|---|---|---|
| 2,995,123 A | * | 8/1961 | Goschel | 123/470 |
| 3,943,904 A | * | 3/1976 | Byrne | 123/470 |
| 4,550,700 A | | 11/1985 | Yoshida et al. | 123/432 |
| 4,671,234 A | * | 6/1987 | Tegtmeier | 123/432 |
| 4,768,487 A | | 9/1988 | Yamamoto et al. | 123/470 |
| 5,146,897 A | * | 9/1992 | Hattori et al. | 123/470 |
| 5,156,124 A | * | 10/1992 | Sugimoto et al. | 123/302 |
| 5,167,211 A | * | 12/1992 | Fukuma et al. | 123/308 |
| 5,273,014 A | * | 12/1993 | Mitobe et al. | 123/336 |
| 5,325,829 A | | 7/1994 | Iwasiuk | 123/336 |
| 5,417,190 A | * | 5/1995 | Ando et al. | 123/308 |
| 5,575,263 A | * | 11/1996 | Pontoppidan et al. | 123/470 |
| 5,651,344 A | * | 7/1997 | Nishigaki et al. | 123/432 |
| 5,852,994 A | * | 12/1998 | Tsuzuku et al. | 123/308 |
| 6,209,501 B1 | | 4/2001 | Kaneko | 123/184.21 |
| 6,591,805 B1 | | 7/2003 | Karlsson et al. | 123/184.56 |

FOREIGN PATENT DOCUMENTS

| | | |
|---|---|---|
| DE | 19834835 A1 | 2/2000 |
| DE | 19941179 A1 | 3/2000 |
| EP | 0 544 978 A1 | 6/1993 |
| EP | 1001147 A2 | 5/2000 |
| JP | 60219454 | 11/1985 |
| JP | 2000073920 | 3/2000 |

OTHER PUBLICATIONS

European Search Report; EP 03 01 2303; dated Sep. 1, 2003.
English Abstract of DE 19941179, dated Mar. 2, 2000.
English Abstract of EP 1001147, dated May, 17, 2000.
Abstract of DE 19834835, dated Feb. 3, 2000.

* cited by examiner

*Primary Examiner*—Hai Huynh
(74) *Attorney, Agent, or Firm*—Arent Fox, PLLC

(57) ABSTRACT

A device for air/fuel manifolds adapted to generate turbulent flows in combustion chambers. The device comprises a plurality of runners each of which internally comprises a longitudinal baffle adapted to form two channels each having a respective flow of air/fuel mixture to the combustion chamber. Moreover, in one channel is housed a throttle having, in its fully closed position, an aureole which extends along the whole perimeter of the throttle. The longitudinal baffle has a port for communication between the two channels, whereas a jet of fuel generated by an injector is targeted on the port for communication between the two channels.

6 Claims, 9 Drawing Sheets ized by fusion
FLOW DIVIDER DEVICE FOR AIR MANIFOLDS ADAPTED TO GENERATE TURBULENT FLOWS IN COMBUSTION CHAMBERS The present invention relates to a device for air manifolds adapted to create turbulent flows in combustion chambers.

BACKGROUND OF THE INVENTION

Air manifolds adapted to take in air from the external atmosphere and to supply this air to the combustion chambers are well known in the prior art. These manifolds have a number of ducts (commonly called runners) equal to the number of cylinders that need to be supplied with air, or with an air/fuel mixture, depending on whether the combustion chambers have a direct fuel injection system or there is air/fuel premixing in the engine prior to entry into the combustion chamber via a respective delivery valve.

The flow of air, or of air mixed with fuel, injected is controlled by means of a regulation system controlled by the accelerator pedal of the motor vehicle. In a conventional manner, the greater the power requirement, the greater the opening of the throttle will be so that a greater quantity of air (or air/fuel mixture) can be injected into the combustion chamber.

One of the problems of these conventional systems is that an optimum regulation of the supply flow to the cylinders is not obtained, especially at a low number of revolutions of the engine. Moreover, current systems do not ensure turbulent flows of the swirl type within the combustion chambers in an optimum manner.

SUMMARY OF THE INVENTION

The object of the present invention is therefore to provide an air, or air/fuel, supply system free from the drawbacks discussed above.

The invention therefore relates to a device for air manifolds according to the characteristic features claimed in claim 1.

BRIEF DESCRIPTION OF THE DRAWINGS

The present invention will be described below with reference to the accompanying drawings, which show a non-limiting embodiment thereof, and in which.

DETAILED DESCRIPTION OF THE INVENTION

Figure 1:
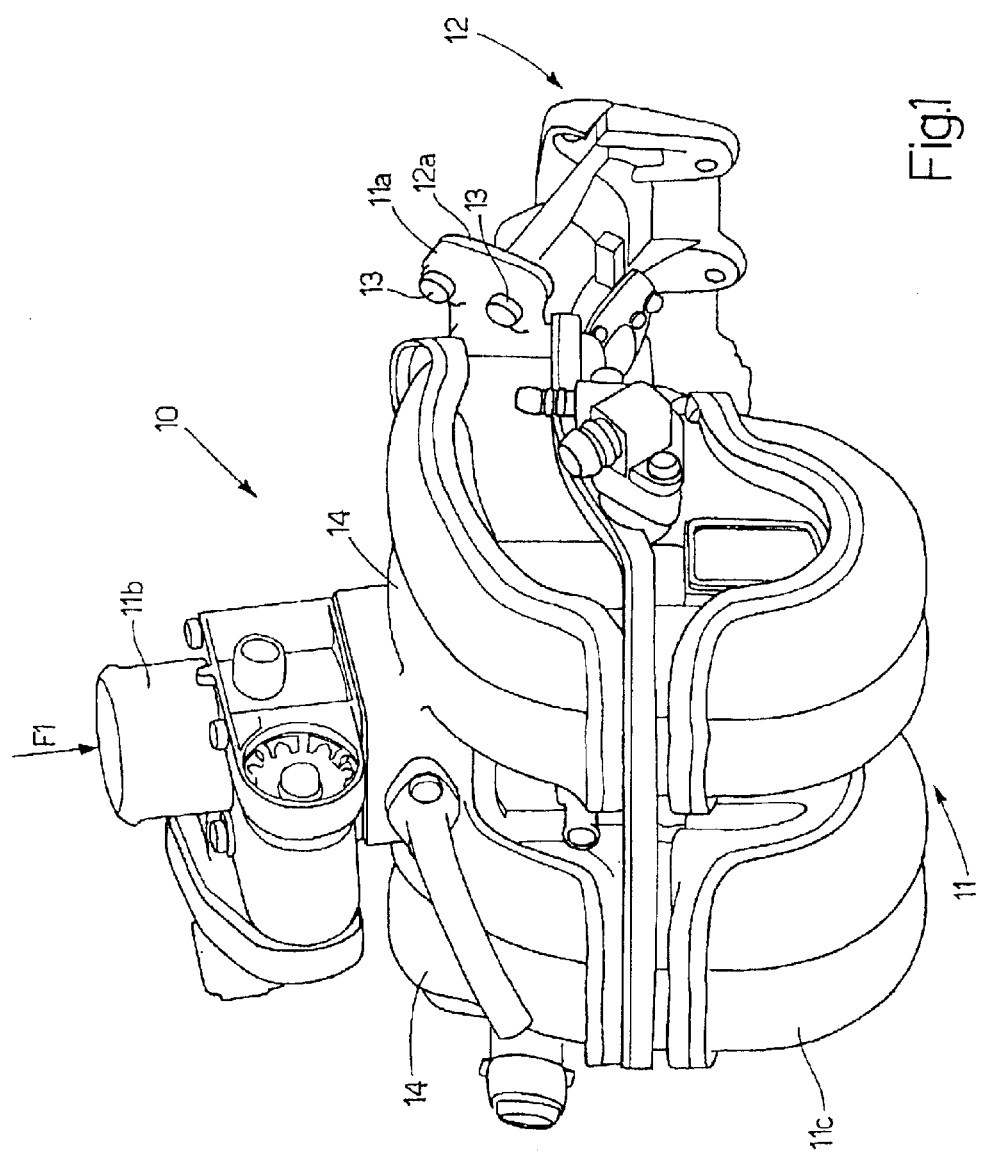
FIG. 1 is a three-dimensional view of a flow divider device of the present invention associated with an air manifold for internal combustion engines; the assembly of the air manifold and the flow divider device provides an air unit.
Figure 2:
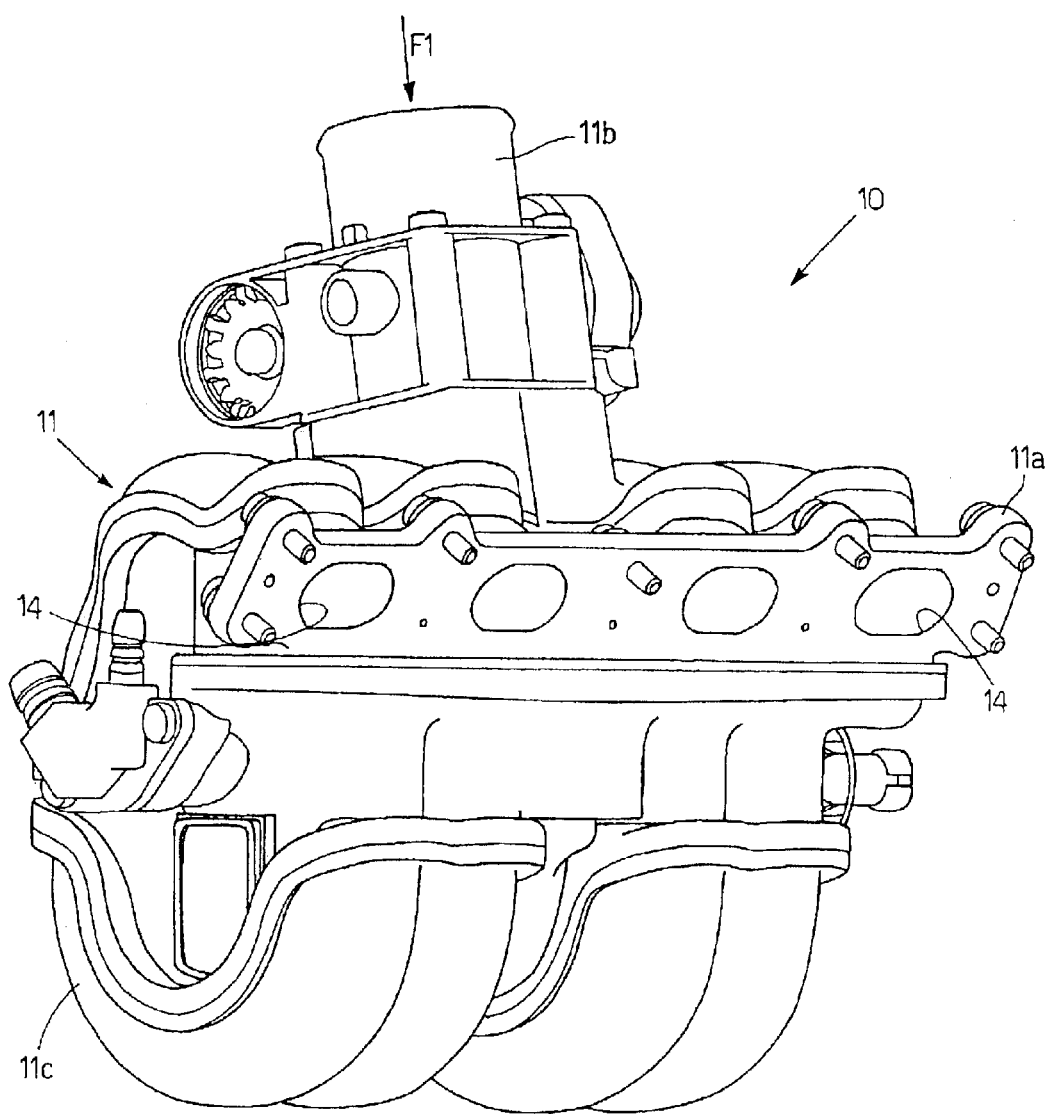
FIG. 2 is a further three-dimensional view solely of the air manifold of FIG. 1.
Figure 3:
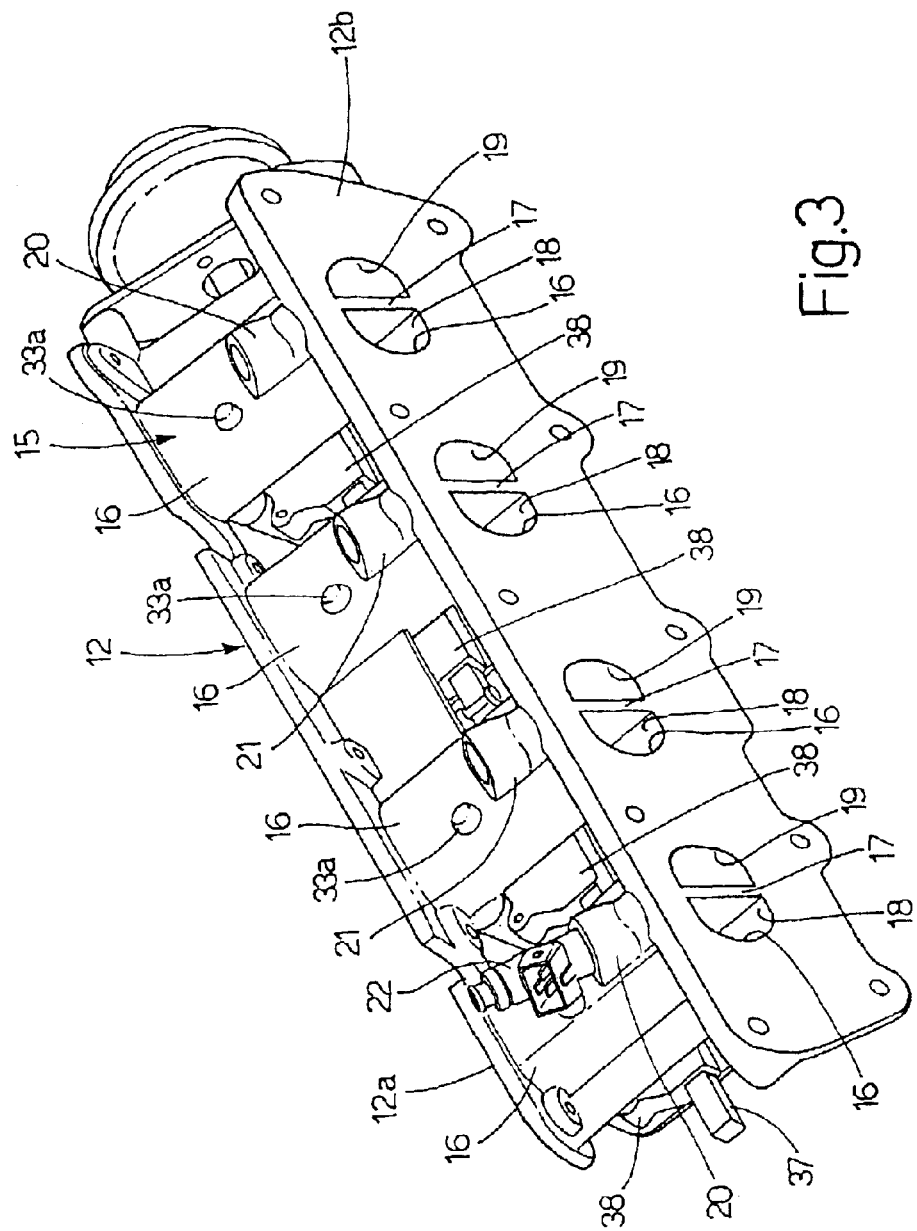
FIG. 3 is a three-dimensional view solely of the flow divider device of the present invention.

In FIG. 1, an air unit is shown by 10 and comprises an air manifold 11 and a flow divider device 12 secured to one another by means of respective flanges 11a, 12a bearing on one another and clamped together by a plurality of bolts 13 (FIG. 1).

It will be appreciated that only structural details essential for comprehension of the present invention will be described and numbered in the following description.

The air manifold 11 further comprises, in a conventional manner, a duct 11b for the intake of air from outside in the direction of the arrow F1, and a main body 11c wound in a spiral (to increase the air turbulence) according to the turns of a plurality of upstream runners 14 whose number is equal to the number of combustion chambers (not shown). In this case, there are four runners, so that the air unit 10 is able to supply a four-cylinder engine (not shown).

As shown in further detail in FIGS. 3 to 7, the device 12 comprises a main body 15 obtained, for instance, by fusion of a light alloy, which in turn comprises a plurality of runners 16 equal in number to the number of upstream runners 14. Since, as mentioned above, the flange 12a of the device 12 is clamped to the flange 11a of the air manifold 11, each runner 16 has to be seen as the continuation of the respective upstream runner 14.

In addition to the flange 12a, the device 12 comprises a further flange 12b, disposed on the opposite side with respect to the main body 15, which is adapted to secure the unit 10 to the head (not shown) of an engine. The main body 15 and the two flanges 12a, 12b are, moreover, also preferably provided in one piece.

As shown in further detail in FIGS. 3 and 5 to 8, each runner 16 has a respective longitudinal baffle 17. Each longitudinal baffle 17 extends between the two flanges 12a and 12b and is also preferably obtained rigidly with the other members of the device 12.

Moreover, each baffle 17 divides the respective runner 16 longitudinally into two channels 18 and 19 having a substantially identical cross-section.

Each channel 18, 19, as will be described in further detail below, has a different function (see below).

While the channel 19 has no throttle member, the channel 18 comprises a respective throttle 20 adapted to be rotated by a mechanism that will be described in further detail below (see below).

Figure 4:
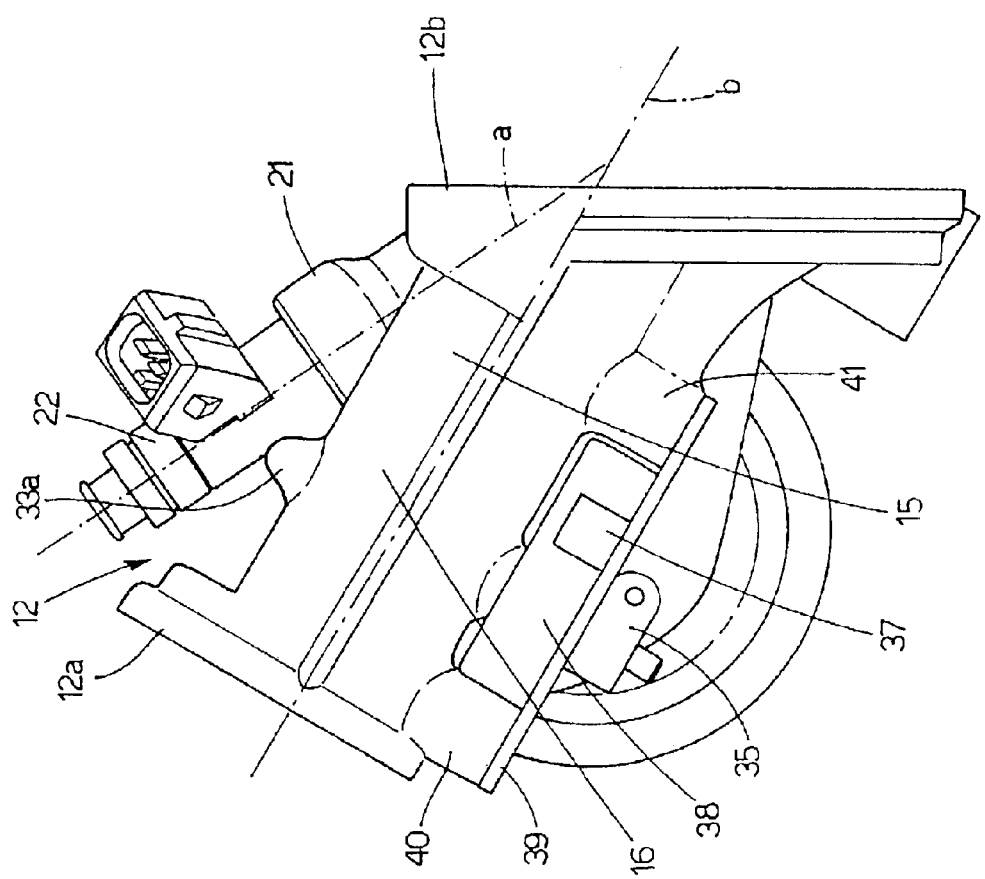
FIG. 4 is a side view of the flow divider device of FIG. 3.
Figure 5:
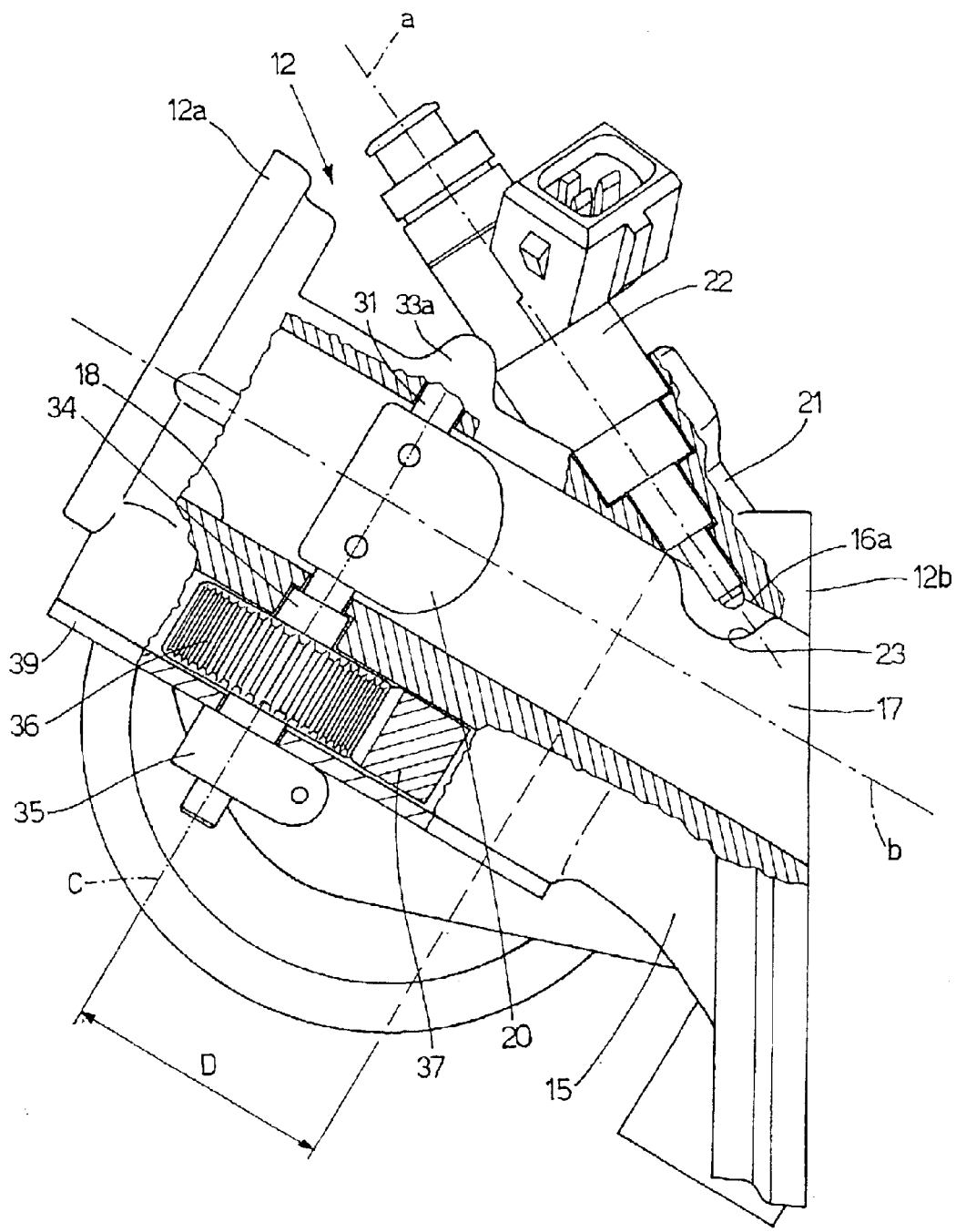
FIG. 5 is a longitudinal section through the flow divider device of FIG. 4.

The outer surface of each runner 16 is provided with a respective seat 21 adapted to house a respective injector 22 (FIGS. 3 to 5) supplied with petrol by a fuel distribution system 22a (FIG. 5). Each seat 21 communicates, moreover, with the respective channel 16 via an aperture 16a (FIGS. 5, 6).

As shown in FIGS. 4 and 5, the axis (a) of the seat 21 (and therefore of the injector 22) is inclined with respect to an axis (b) of longitudinal symmetry of the respective runner 16.

Figure 6:
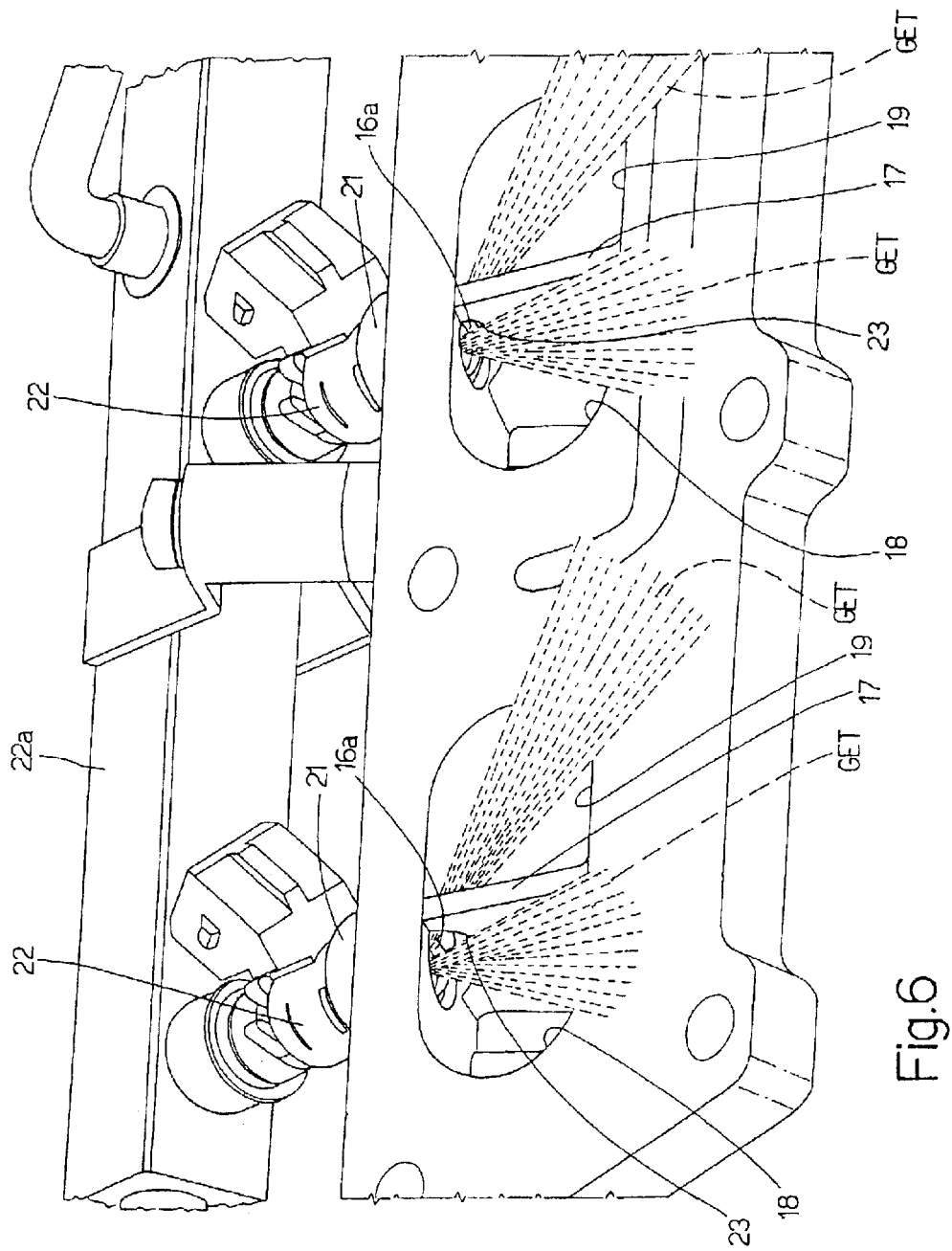
FIG. 6 is a front view, on an enlarged scale, of the flow divider device of FIG. 3.

Moreover, as shown in FIGS. 5 and 6, the seat 21 and the injector 22 are disposed astride the respective baffle 17. To allow the jet GET of the injector 22 to be divided between the channels 18, 19, the baffle 17 is provided with a port 23 at the location of the opening 16a of the seat 20 communicating with the runner 16.

Figure 8:
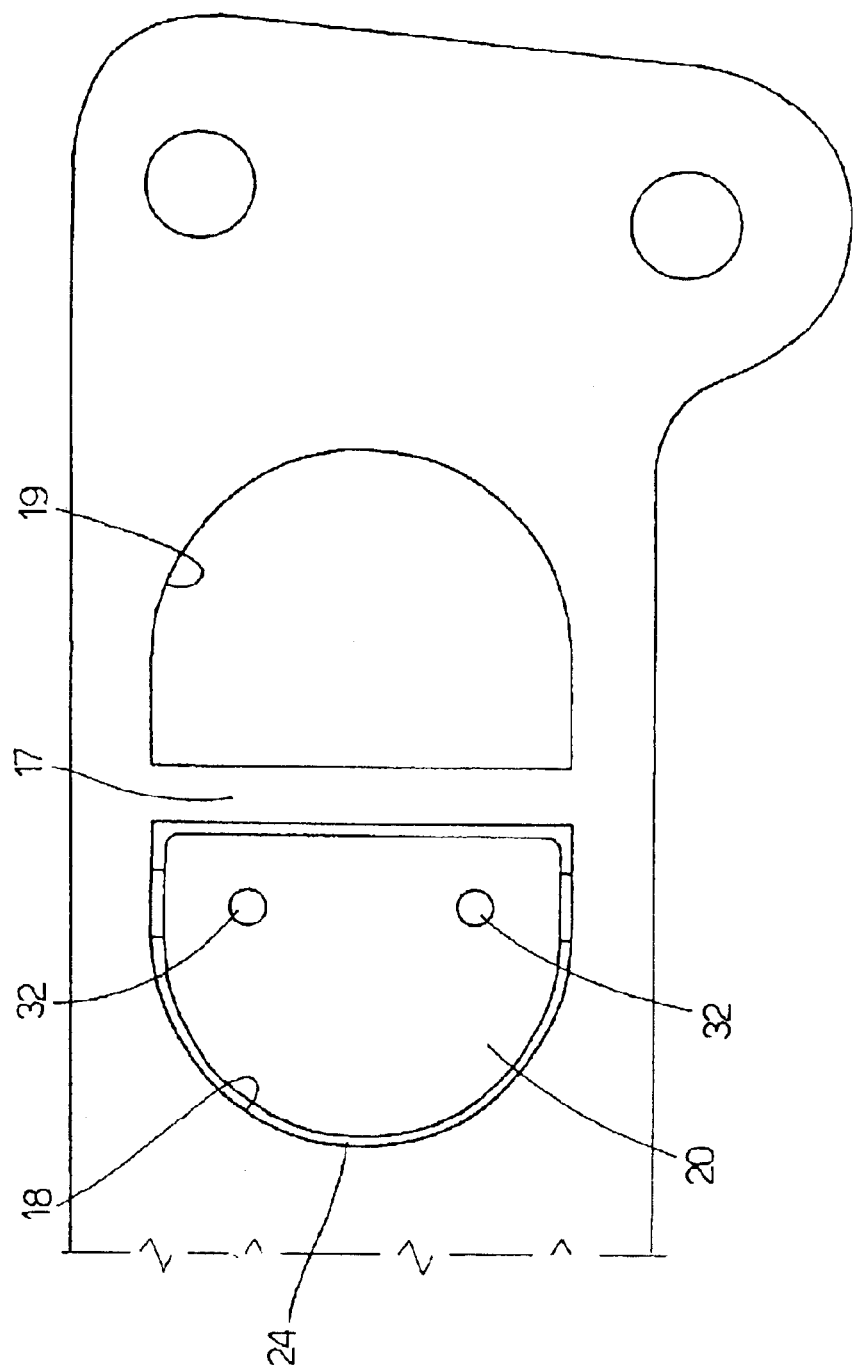
FIG. 8 shows some details of the flow divider device of FIG. 3.

With further reference to FIG. 8, it can be seen that between the throttle 20 and the inner walls of the channel 19 relative thereto, there continues to be an aureole 24 through which a certain quantity of air from the air manifold 11 can continue to pass, even when the throttle 20 is in the fully closed position as shown in FIG. 8. As a result of this, a certain quantity of air always "washes" the channel 18 in which the throttle 20 is housed so that any particles of fuel remaining on the walls of this channel 18 continue to be supplied to the respective combustion chamber (not shown). This feature prevents the accumulation of a certain quantity of fuel on the walls of the channel 18 which could be the cause of undesirable effects in the combustion chamber when the throttle 20 is opened again when the driver requires a sudden increase in power by acting on the accelerator pedal (not shown).

Advantageously, the throttle 20 divides the flow of air in the channel 18, whose air does not provide the air/fuel mixture with a swirl movement.

Moreover, in order to obtain optimum performances, the aureole 24 extends along the whole perimeter of the throttle 20 and there should preferably be a "coverage factor" (k) varying between 0.83 and 0.9; the term "coverage factor" means the ratio between the surface area of the throttle 20 and the surface area of the transverse section of the channel 18.

The throttle 20 is always upstream (with respect to the direction of flow of the air from the air manifold 11 to the engine head) of the port 23 and the opening 16a through which the fuel is injected.

It has been discovered experimentally that each throttle 20 must be mounted in a position close to the respective port 23. In practice, with the throttle 20 closed (position shown in FIG. 8), its surface facing the head of the engine must be disposed at a distance of between 2 and 5 mm, preferably 3 mm, from the closest edge of the port 23 which brings the two channels 18, 19 into communication.

In other words, as shown in FIG. 5, the distance D between the axis (c) of the throttle 20 and the closest edge of the port 23 must be between 2 and 5 mm, preferably 3 mm.

Among other things, it has also been experimentally discovered that to prevent the undesired effects of mixture passing from the channel 18 to the channel 19, the surface area of the port must be between 230 and 270 $mm^2$, and, preferably, should not exceed 250 $mm^2$.

Figure 7:
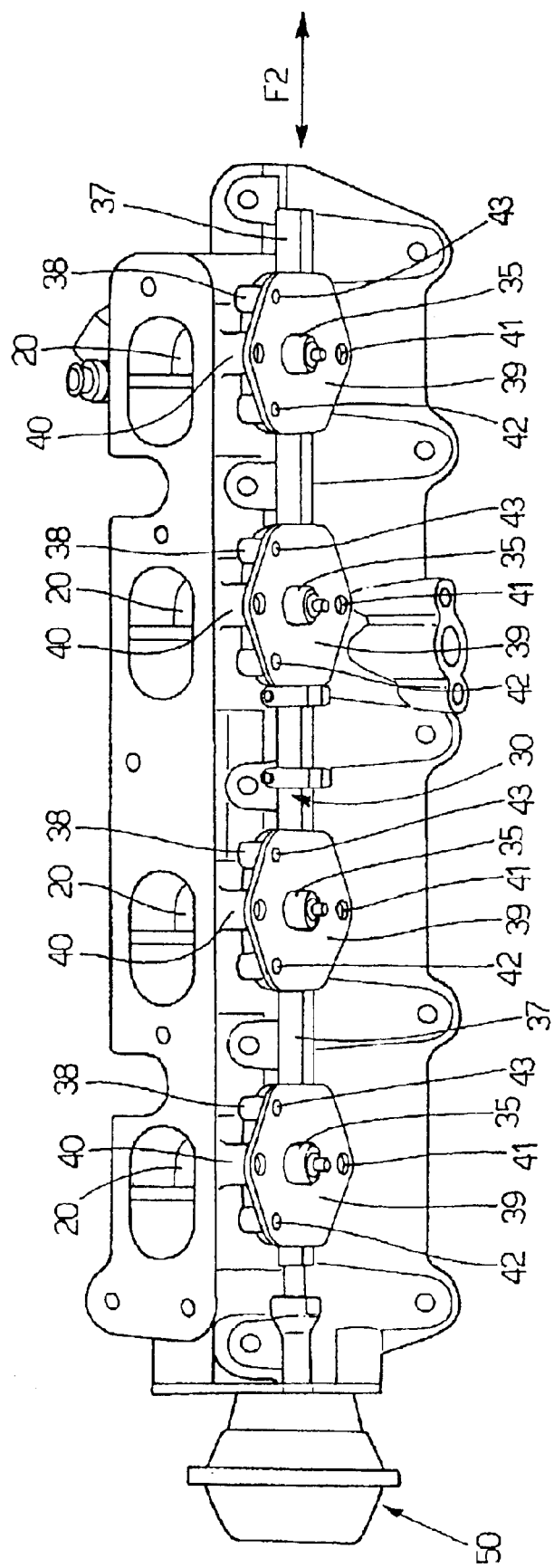
FIG. 7 is a further overall view of the flow divider device of FIG. 3.
Figure 9:
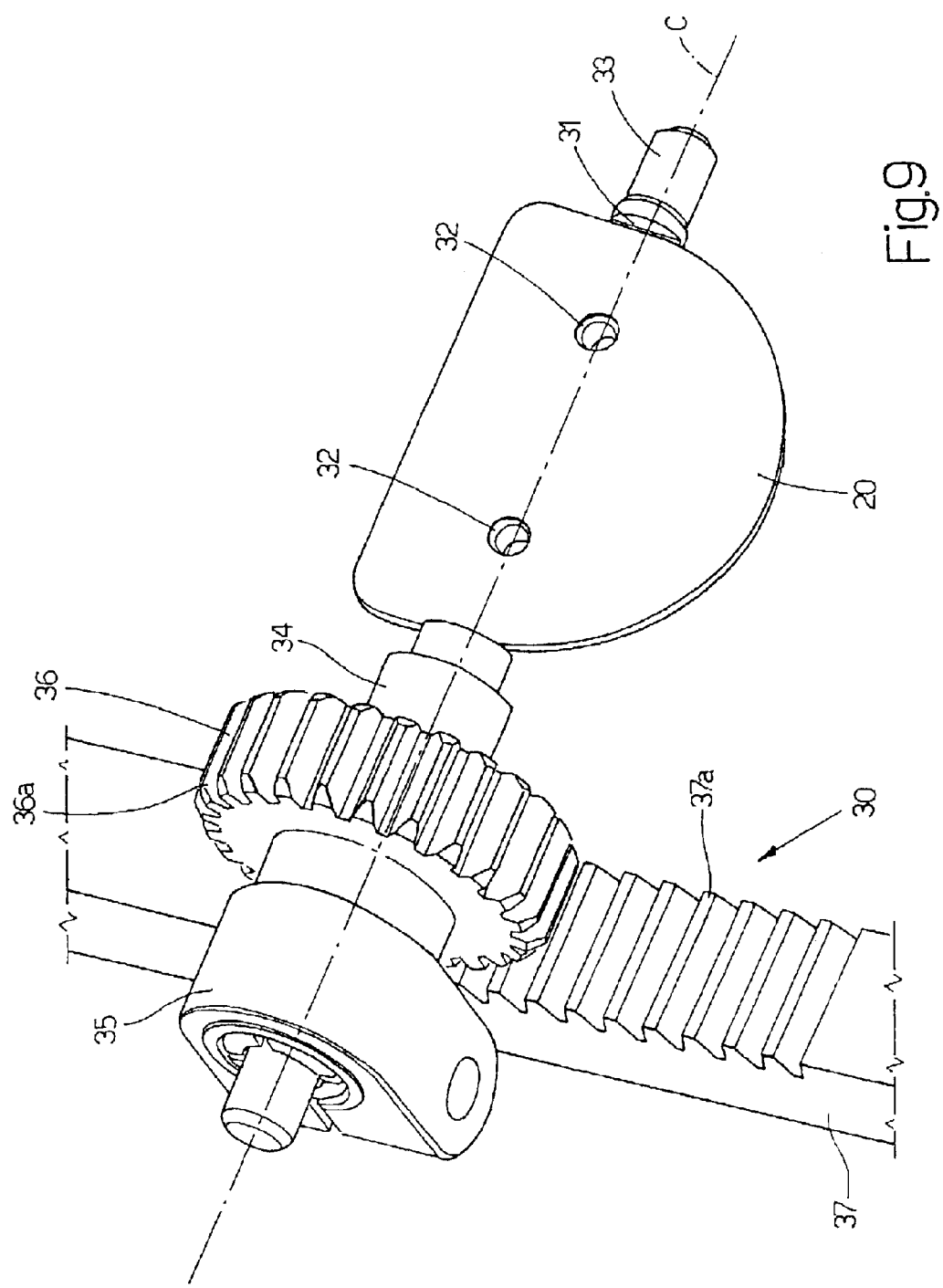
FIG. 9 shows a throttle whose rotation about an axis is achieved by means of a novel rack mechanism.

In a novel manner, all the throttles 20 are caused to rotate by the same rack mechanism 30 (see FIGS. 7 and 9 in particular).

In practice, as shown in FIGS. 7 and 9, each throttle 20 is secured to a respective spindle 31 by means of two screws 32. The spindle 31 is supported by a pair of bearings 33, 34 (FIG. 9) and by a support member 35. Each bearing 33 is housed in a seat 33a provided in the respective channel 18.

As shown in FIG. 9 in particular, between the bearing 34 and the support member 35 there is a toothed wheel 36 with straight teeth which meshes permanently with a rack rod 37. Each toothed wheel 36 is contained in a respective casing 38 which is closed by a plate 39 in turn bearing on and screwed to two lugs 40, 41 (FIGS. 4 and 5) which project from the outer surface of each runner 16.

With reference to FIG. 7, each plate 39 further comprises two through holes 42, 43 which make it possible to secure, by means of screws (not shown), the respective casing 38 containing, as mentioned above, a respective toothed wheel 36.

With further reference to FIG. 7, it can be seen that the rack rod 37 is moved in translation by an electric motor unit 50 in the directions shown by the double arrow F2 in order to open (or close) the channels 18 by means of the throttles 20, depending on the driving conditions set by the driver by means of the accelerator pedal (not shown) and an electronic control unit (not shown). The electronic control unit converts the signal received from the accelerator and supplies it to each throttle 20. The rack rod 37 is, moreover, housed partially in the casing 38.

In other words, the rack mechanism 30 causes the movement in translation of the rack rod 37 in the directions shown by the double arrow F2. Since the teeth 37a (FIG. 9) of the rack rod 37 are meshed with the teeth 36a of the toothed wheel 36, a translation of this rack rod 37 causes the spindle 31 to rotate about the axis (c) (FIGS. 5, 9) which, as mentioned above, is supported by the bearings 33, 34, the support member 35 and the plate 39.

It will be appreciated that at low speeds, each channel 18 is completely closed by the respective throttle 20, apart from the aureole 24, which continues to allow the passage of a certain quantity of washing air. When, however, the driver wishes to increase the power supplied by the engine, the mechanism 30 causes the opening of the throttles 20 so as to enable the introduction of a greater quantity of air/petrol mixture into the combustion chambers.

The rack mechanism 30, and in particular the actuation of the motor unit 40, is controlled and commanded by an electronic control unit (not shown).

The operation of the device 12 of the present invention can be readily deduced from the above description and will not therefore be described in detail below.

Moreover, the comments made up to now with reference to a conventional injection plant apply, mutatis mutandis, to a direct injection engine (not shown), i.e. when the petrol, rather than being injected into the runner 16, is injected directly into the combustion chamber.

The advantages of the device of the present invention are as follows:
  improved control of the inlet flows of air/fuel mixture (or air alone in the case of direct injection) into the combustion chamber;
  achievement of optimum turbulence by means of the creation of vortices of the swirl type in the combustion chamber;
  creation, at low speeds, of a washing flow in the channel comprising the throttle, even when the latter is in its completely closed position; this prevents the accumulation of particles of fuel in the channel provided with the throttle, which are very often the cause of incorrect combustion when the driver requires a sudden increase in engine power;
  optimal actuation of the opening/closing of the throttles as a result of the use of a rack mechanism.

What is claimed is:

1. A device (12) for air/fuel manifolds (11) adapted to generate turbulent flows in combustion chambers, which device (12) comprises a flanged main body (15) and at least one injector (22), said flanged main body (15) comprising, in its turn, a plurality of runners (16) each of which is in fluid-dynamic communication, at one end, with a corresponding upstream runner (14) belonging to the air/fuel manifold (11) and, at another end, with a corresponding combustion chamber to which an air/fuel mixture is supplied; a device (12) wherein each runner (16) internally comprises a longitudinal baffle (17) adapted to form two channels (18, 19) each having a respective flow of air/fuel mixture to the combustion chamber, in one channel (18) being housed a throttle (20) having, in its fully closed position, an aureole (24) which extends along the whole perimeter of the throttle (20); the device (12) being characterised in that the longitudinal baffle (17) has a port (23) for communication between the two channels (18, 19), and in that a jet (GET) of fuel generated by said at least one injector (22) is targeted on the port (23) for communication between the two channels (18, 19).

2. A device (12) as claimed in claim 1, wherein the "coverage factor" (k) of the throttle (20) with respect to the transverse section of the channel (18) varies between 0.83 and 0.9.

3. A device (12) as claimed in claim 1, wherein the throttle (20) is disposed upstream of the port (23), the surface of this throttle (20) facing the head having a distance (D) of between 2 and 5 mm from the closest edge of this port (23).

4. A device (12) as claimed in claim 3, wherein this distance (D) is 3 mm.

5. A device (12) as claimed in claim 1, wherein the surface area of the port (23) is between 230 and 270 mm$^2$.

6. A device (12) as claimed in claim 5, wherein the surface area of this port (23) does not exceed 250 mm$^2$.

* * * * *